United States Patent [19]

Blumenstock

[11] Patent Number: 5,383,438
[45] Date of Patent: Jan. 24, 1995

[54] TANK VENTING SYSTEM FOR AN INTERNAL COMBUSTION ENGINE

[75] Inventor: Andreas Blumenstock, Ludwigsburg, Germany

[73] Assignee: Robert Bosch GmbH, Stuttgart, Germany

[21] Appl. No.: 177,817

[22] Filed: Jan. 4, 1994

[30] Foreign Application Priority Data

Feb. 5, 1993 [DE] Germany ............... 4303309

[51] Int. Cl.⁶ .................................. F02M 37/04
[52] U.S. Cl. ..................... 123/520; 123/198 D
[58] Field of Search ............ 123/520, 519, 518, 516, 123/521, 198 D

[56] References Cited

U.S. PATENT DOCUMENTS

| | | | |
|---|---|---|---|
| 4,527,532 | 7/1985 | Kasai | 123/520 |
| 4,986,070 | 1/1991 | Abe | 123/520 |
| 5,056,493 | 10/1991 | Holzer | 123/520 |
| 5,103,794 | 2/1992 | Shiraijhi | 123/520 |
| 5,115,785 | 5/1992 | Cook | 123/520 |
| 5,172,672 | 12/1992 | Harada | 123/520 |
| 5,183,023 | 2/1993 | Hanson | 123/520 |
| 5,193,512 | 3/1993 | Steinbrenner et al. | |

FOREIGN PATENT DOCUMENTS 97172426 8/1991 WIPO .

Primary Examiner—Carl S. Miller
Attorney, Agent, or Firm—Edwin E. Greigg; Ronald E. Greigg

[57] ABSTRACT

A tank venting system which avoids soiling of the negative pressure protection valve which can cause problems in functional capability. The negative pressure protection valve is preceded by the intake air filter of the engine, so that with the negative pressure protection valve opened, a pressure equalization between the atmosphere and the tank venting system takes place by means of intake air filtered by the intake air filter. The tank venting system according to the invention is used to vent a fuel tank of a mixture-compressing internal combustion engine with externally supplied ignition.

9 Claims, 1 Drawing Sheet

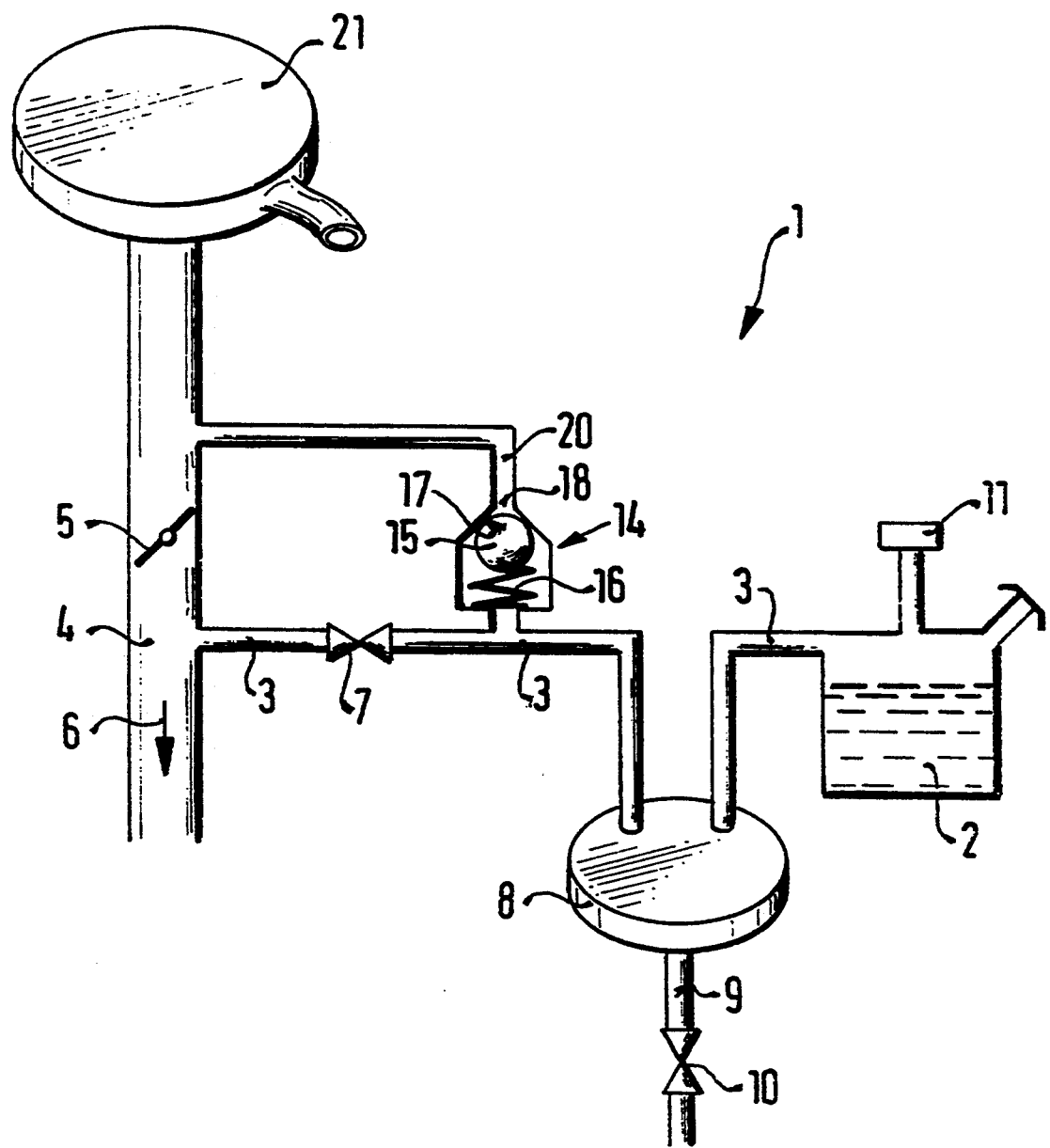

TANK VENTING SYSTEM FOR AN INTERNAL COMBUSTION ENGINE

BACKGROUND OF THE INVENTION

The invention is based on a tank venting system for an internal combustion engine as defined hereinafter. A tank venting system is already known (WO 91/12426), in which the fuel components volatilized in the fuel tank of the engine are carried via a tank venting line into an intake conduit of the engine and from there are delivered to the engine.

The introduction of the volatilized fuel into the intake conduit is advantageously performed downstream of a throttle valve disposed in the intake conduit and is reinforced by the negative intake tube pressure prevailing there. A tank venting valve and an adsorption filter are typically interposed between the fuel tank and the intake conduit in the tank venting line. The tank venting valve serves to selectively turn the tank venting on or off or to meter it and is located near the intake conduit. The adsorption filter is located between the tank venting valve and the fuel tank and adsorbs the volatilized fuel components that have escaped from the fuel tank.

The adsorption filter communicates with the atmosphere via a ventilation line, so that with the tank venting valve opened and with the aid of the negative intake tube pressure, fresh air flows through the adsorption filter, and a mixture of air and fuel is carried to the intake conduit, whereby the adsorption filter is regeneratable. The ventilation line is closeable by a shutoff valve, so that for checking whether the tank venting system is functional, a negative pressure can be built up in the fuel tank with the shutoff valve closed and the tank venting valve opened.

To avert an impermissibly pronounced negative pressure during the negative pressure check or if a functional fault occurs in the tank venting system, a protection valve is provided which, if a predetermined pressure difference between atmospheric pressure and negative pressure in the tank venting system is exceeded, opens so that a pressure equalization can take place between the atmosphere and the tank venting system. The negative pressure protection valve can be disposed in a known way at an arbitrary point upstream of the tank venting valve, for instance on the fuel tank, the tank venting line, or the ventilation line leading to the absorption filter.

A disadvantage of this kind of negative pressure protection valve is that its function may be unfavorably impaired as a consequence of soiling. Soiling of the negative pressure protection valve can for instance hinder the pressure equalization, and as a result the tank venting system can become damaged. Moreover, if the negative pressure protection valve is opened, dirt particles that penetrate the valve can prevent the negative pressure protection valve from being completely closeable once the pressure equalization has taken place, so that a leak occurs in the tank venting system. To assure that the function of the tank venting system will remain durably correct, the negative pressure protection valve, in known tank venting systems, must therefore be protected against soiling by expensive, complicated measures.

OBJECT AND SUMMARY OF THE INVENTION

The tank venting system according to the invention has the advantage over the prior art of averting disadvantageous effects on the function of the negative pressure protection valve because of soiling, and that complicated, expensive measures for protecting the negative pressure valve against soiling can be dispensed with.

The invention will be better understood and further objects and advantages thereof will become more apparent from the ensuing detailed description of a preferred embodiment taken in conjunction with the drawing.

BRIEF DESCRIPTION OF THE DRAWING

The single FIGURE of the drawing is a simplified illustration of the tank venting system of the invention.

DESCRIPTION OF THE PREFERRED EMBODIMENT

The drawing shows a tank venting system 1 with a fuel tank 2 and a tank venting line 3, which connects the fuel tank 2 to an intake conduit 4, leading to an internal combustion engine not shown in detail in the drawing. Fuel components volatilizing out of the fuel in the fuel tank can be delivered by means of the tank venting line 3 to the engine via the intake conduit 4 in the direction of an arrow 6. The introduction of the fuel components into the intake conduit 4 advantageously takes place downstream of a throttle valve 5 located in the intake conduit 5, because the negative intake tube pressure that prevails there reinforces the introduction of the fuel.

A tank venting valve 7 is disposed near the intake conduit 4 in the tank venting line 3 and serves to selectively turn the tank venting on or off or to meter it. An adsorption filter 8, which is interposed between the tank venting valve 7 and the fuel tank 2 in the tank venting line 3, adsorbs the fuel components that have volatilized from the fuel tank 2. In addition to the tank venting line 3, a ventilation line 9 with an associated shutoff valve 10 discharges into the adsorption filter 8, so that, with the tank venting valve 7 and the shutoff valve 10 both opened, ambient air can be flushed via the ventilation line 9 through the adsorption filter 8 to the intake conduit 4, so that the adsorption filter 8 is regenerated.

To check its functional capability, the tank system may be acted upon by negative pressure with the tank venting valve 7 open and the shutoff valve 10 closed. With the aid of a known differential pressure sensor 11, which may for instance communicate with the fuel tank 2, any leak that may be present in the tank venting system 1 or in the fuel tank 2 can then be found.

To prevent the imposition of an inadmissibly pronounced negative pressure upon the tank venting system 1, a negative pressure protection valve 14 is provided. By way of example, the negative pressure protection valve 14 is embodied as a check valve, and it includes a valve closing body 15 that is kept pressed against a valve seat 17 by a valve closing spring 16, with a predetermined valve closing spring force. The negative pressure protection valve 14 is disposed in the tank venting system 1 in such a way that as the negative pressure increases in the tank venting system 1, the closing force of the valve seat body 15 upon the valve seat 17, which force is characterized by the forces of air and the valve closing spring, lessens, and at a differential pressure that is dependent on the prestressing of the valve closing spring 16, the valve closing body 15 lifts from the valve seat 17 and uncovers a flow opening 18. According to the invention, the flow opening 18 communicates via a connecting line 20, with a region of the intake conduit 4 located upstream of the throttle valve 5 and downstream of an intake air filter 21, so that with the negative pressure protection valve 14 opened, the pressure equalization between the atmosphere and the tank venting system 1 takes place by means of filtered intake air. The branching off of the connecting line 20 may also be provided directly in the clean region of the intake air filter 21.

The negative pressure protection valve 14 need not be disposed near the tank venting valve 7 as shown in the drawing figure; instead, with communication with the intake conduit 4 between the intake air filter 21 and the throttle valve 5, it may be disposed at any arbitrary point within the tank venting system 1 upstream of the tank venting valve 7, for instance at the ventilation line 9 between the adsorption filter 8 and the shutoff valve 10, or on the fuel tank 3. The negative pressure protection valve 14 may also be located near the intake conduit 4 or the intake air filter 21, in which case the connecting line 20 then extends from the negative pressure protection valve 14 to a corresponding introduction point inside the tank venting system 1. Naturally, the negative pressure protection valve 14 may also be interposed in the connecting line 20.

By way of example, the connecting line 20 may be embodied by a connecting hose or a connecting tube. As a result of the closed disposition of the negative pressure protection valve 14, the installation point of the negative pressure protection valve 14 can be chosen regardless of the prevailing soiling conditions. It is advantageous to install the negative pressure protection valve 14 or the beginning of the connecting line 20 at the tank venting line 3 between the adsorption filter 8 and the tank venting valve 7, because then the connecting line 20 can be made especially short and secure against being crushed. By drawing compensating air for the pressure equalization from the intake air filter 21, it becomes unnecessary to provide a separate, supplementary filter for the negative pressure protection valve 14.

The foregoing relates to a preferred exemplary embodiment of the invention, it being understood that other variants and embodiments thereof are possible within the spirit and scope of the invention, the latter being defined by the appended claims.

What is claimed and desired to be secured by Letter Patent of the United States is:

1. A tank venting system for a mixture-compressing internal combustion engine with externally supplied ignition, having an intake conduit (4), an air filter (21) connected with said intake conduit, a throttle valve (5) in said intake conduit downstream of said air filter, a fuel tank (2) that communicates via a tank venting line (3) with the intake conduit (4) downstream of said throttle valve; a tank venting valve (7) disposed in the tank venting line; a negative pressure protection valve (14) which bypasses said throttle valve and protects the tank venting system from an imposition of an inadmissibly pronounced negative pressure, the negative pressure protection valve (14) is connected with said intake conduit upstream of said throttle valve (5) and is preceded by the intake air filter (21) of the engine, so that with the negative pressure protection valve (14) open, a pressure equalization between the atmosphere and the tank venting system (1) takes place by means of the intake air filtered by the intake air filter (21).

2. A tank venting system as defined by claim 1, in which the negative pressure protection valve (14) is connected with the tank venting line (3) near the tank venting valve (7), on a side of the tank venting valve (7) remote from the intake conduit (4).

3. A tank venting system as defined by claim 1, in which the negative pressure protection valve (14) is embodied as a check valve.

4. A tank venting system as defined by claim 1 which includes an absorption filter (8) interposed in said tank venting line (3) upstream of said tank venting valve.

5. A tank venting system as defined by claim 2 which includes an absorption filter (8) interposed in said tank venting line (3) upstream of said tank venting valve.

6. A tank venting system as defined by claim 3 which includes an absorption filter (8) interposed in said tank venting line (3) upstream of said tank venting valve.

7. A tank venting system as defined by claim 4 which includes a ventilation line (9) connected with said absorption filter, and an associated shutoff valve (10) in said ventilation line (9) through which ambient air is passed in order to regenerate said absorption filter.

8. A tank venting system as defined by claim 5 which includes a ventilation line (9) connected with said absorption filter, and an associated shutoff valve (10) in said ventilation line (9) through which ambient air is passed in order to regenerate said absorption filter.

9. A tank venting system as defined by claim 6 which includes a ventilation line (9) connected with said absorption filter, and an associated shutoff valve (10) in said ventilation line (9) through which ambient air is passed in order to regenerate said absorption filter.

* * * * *